US006994623B2

(12) United States Patent
Isfort et al.

(10) Patent No.: US 6,994,623 B2
(45) Date of Patent: Feb. 7, 2006

(54) METHOD AND APPARATUS FOR CONTROLLING A TRANSFER DEVICE, ESPECIALLY FOR HARVESTED MATERIAL OF A HARVESTING MACHINE

(75) Inventors: Heinrich Isfort, Duelmen (DE); Manfred Pollklas, Rheda-Wiedenbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 68 days.

(21) Appl. No.: 10/655,429

(22) Filed: Sep. 4, 2003

(65) Prior Publication Data

US 2004/0053653 A1 Mar. 18, 2004

(30) Foreign Application Priority Data

Sep. 10, 2002 (DE) ............................ 102 42 164

(51) Int. Cl.
*A01F 12/46* (2006.01)

(52) U.S. Cl. .................................. 460/114; 56/10.2 R

(58) Field of Classification Search ............... 460/114, 460/115; 56/10.2 R, 10.2 A; 701/50
See application file for complete search history.

(56) References Cited

U.S. PATENT DOCUMENTS

| 5,000,650 | A | * | 3/1991 | Brewer et al. ............... 414/699 |
| 5,575,316 | A | * | 11/1996 | Pollklas ...................... 141/198 |
| 5,748,097 | A | * | 5/1998 | Collins ..................... 340/686.1 |
| 5,749,783 | A | * | 5/1998 | Pollklas ...................... 460/119 |
| 5,906,648 | A | * | 5/1999 | Zoratti et al. ................. 701/50 |
| 6,186,338 | B1 | * | 2/2001 | Douglas ...................... 209/421 |
| 6,421,996 | B1 | * | 7/2002 | Deutsch et al. ............... 56/341 |
| 6,587,772 | B2 | * | 7/2003 | Behnke ........................ 701/50 |
| 6,682,416 | B2 | * | 1/2004 | Behnke et al. ............... 460/114 |
| 6,718,746 | B2 | * | 4/2004 | Hettiger et al. .............. 56/11.7 |
| 2002/0083695 | A1 | * | 7/2002 | Behnke et al. ................ 56/119 |

FOREIGN PATENT DOCUMENTS

DE            44 03 893 A1        8/1995

* cited by examiner

Primary Examiner—Meredith Petravick
(74) Attorney, Agent, or Firm—Michael J. Striker

(57) ABSTRACT

A method for controlling a transfer device (2) mounted pivotally on a harvesting machine (1) so that it can be pivoted about both a vertical axis (3) and a horizontal axis (4) is described. In this method the transfer device is automatically swung from an actual position (A) about the vertical axis (3) into another position above a supporting member (11) for the transfer device (2) mounted on the harvesting machine (1). The transfer device (2) is then automatically lowered into a street travel position on the supporting member (11) within an event-controlled street travel positioning procedure. Moreover a suitable apparatus for controlling the transfer device (2) is also described.

19 Claims, 3 Drawing Sheets

METHOD AND APPARATUS FOR CONTROLLING A TRANSFER DEVICE, ESPECIALLY FOR HARVESTED MATERIAL OF A HARVESTING MACHINE

BACKGROUND OF THE INVENTION

1. Field of the Invention

The present invention relates to a method for controlling a transfer device pivotally mounted on a harvesting machine so that it can pivot about both a vertical axis and about a horizontal axis, in which the transfer device is automatically pivoted from an actual position to another position on a supporting member for the transfer device, which is mounted on the harvesting machine. Furthermore the invention relates to an appropriate apparatus for suitable control of the transfer device and a harvesting machine with this sort of controller.

2. Description of the Related Art

Self-powered harvesting machines, such as choppers, harvester threshers, sugarcane harvesting machines and the like, usually have a transfer device, e.g. an ejector chute, a corn storage unit discharge device, a conveyor chain or a conveyor belt. The harvested goods are loaded from the harvesting machine onto a transporting vehicle standing or traveling beside it by means of this transfer device. For this purpose the transfer device is positioned by swinging it about both a vertical axis and a horizontal axis into its working position so that the ejected or traveling stream of goods reaches the desired position in the transporting vehicle. The transfer device usually extends laterally from the transporting vehicle. This is not a problem for the harvesting machine on an open field within individual application areas. However lateral extension of the transfer device is not acceptable for safety reasons during travel on an open street to and from the location where it is used because the traveling apparatus is oversized. For street travel the transfer device must be brought into a street travel position, in which the transfer device is usually pivoted to the rear. In order to maintain a permitted vehicle reliable height on the street the transfer device must also be pivoted downward. Standard harvesting machines thus have a supporting member, for example, a supporting or carrying clip, in their rear region, on which the transfer device rests in the street travel position.

The driver usually moves the transfer device to the supporting member for travel in the street travel position. For this purpose the transfer device is swung about its vertical axis and then lowered as soon as the transfer device is over the supporting member. The driver must continuously observe the transfer device and take care that the transfer device is placed gently in the correct position without e.g. damaging the transfer device or the supporting member. It is not good that the region to be observed by the driver during this process is behind the driver's compartment, so that simultaneous observation and control of the transfer device is extremely inconvenient. Moreover it is difficult to position the transfer device exactly over the supporting member, so that no position corrections regarding pivoting about the vertical axis are required during the lowering.

A control device for an ejector chute has already been described in DE 44 03 893 A1, in which the driver can swing the transfer device into three different positions—a working position on the left side, a working position on the right side and a third position above the supporting member—by means of a simple rotary switch. This rotary-switch only rotates the control valve for horizontal pivoting of the transfer device. The driver must then carefully manually lower the transfer device to the supporting member, as before, and observe the transfer device.

SUMMARY OF THE INVENTION

It is an object of the present invention to provide an alternative to this state of the art method of controlling a transfer device of the above-described kind, which is simpler for the driver when the transfer device is to be put in the street travel position.

It is another object of the present invention to provide an apparatus for performing the method according to the invention.

This object and others, which will be made more apparent hereinafter, are attained in a method of controlling a transfer device comprising automatically swinging or pivoting the transfer device from an actual position about the vertical pivot axis into a position above a supporting member for the transfer device arranged on the harvesting machine.

According to the method of the invention the transfer device is automatically lowered into a street travel position on the supporting member in an event-controlled street travel positioning procedure.

Accordingly the apparatus for controlling the transfer device comprises means for automatically swinging or pivoting the transfer device from the actual position about the vertical axis into a position above a supporting member for the transfer device arranged above the harvesting machine. In order to perform the method according to the invention means for automatically lowering the transfer device into a street travel position on the supporting member in an event-controlled street travel positioning procedure are provided.

The triggering event for the procedure can be a street travel position command sent by the driver to a user interface. That is, the driver presses a certain key or operates a switch, for example, in order to start or activate the street travel positioning procedure. The driver must still take care to see that the street travel positioning procedure for the transfer device has been, one the whole, performed. He does not want trouble regarding the pivoting of the transfer device into the correct position and he wants it to be carefully lowered.

For reliable automatic control of the transfer device on the supporting member the apparatus according to the invention must have control means with suitable position determining means, with which the actual position data for the transfer apparatus can be measured. The-position determining means can be e.g. position sensors, which measure the angular position about the vertical axis or horizontal axis. However it can also be a purely software-embodied device, which cooperates with commands and/or signals, which pivot the transfer device, and with the aid of this control data are always informed regarding the exact position. Furthermore in a preferred embodiment the control means for the apparatus is formed so that the signals for the automatic street travel positioning procedure are input to a pivot angle means for pivoting the transfer device about the vertical axis. Also these signals are input to a height positioning device for vertically swinging the transfer device about the horizontal axis.

In an especially preferred embodiment the start of the street travel positioning procedure is automatically coupled with a certain operating state or machine parameter and/or combination of different operating states and/or machine parameters. This has the advantage that the transfer device will be in the proper position for travel on the street after the harvesting machine leaves the field; the driver does not need to remember to initiate the street travel positioning procedure because it is automatic. The danger that the transfer device causes damage to the harvesting machine or an object that collides with the machine is thus considerably reduced.

The apparatus preferably has a controller for that purpose with an evaluating device, which evaluates input control commands for controlling the harvesting machine and/or status signals, which represent certain operating states and/or machine parameters of the harvesting machine. Certain control commands, status signals or combinations of control commands activate or initiate the street travel positioning procedure. Since control commands for turning on an operating state must be sent, for example, from a user interface without more to the concerned devices of the harvesting machine, these control commands are known as activating or triggering output from the evaluating device. In as much as use of these control commands is not possible because they concern harvesting machine parameters, such as distance traveled, speed, etc., preferably suitable status signals of the machine, for example signals from the travel distance and/or speed measuring device, are registered and referred to for evaluation.

The automatic street positioning, for example, can be associated with the following operating state and/or operating state combination.

In one possible embodiment activation of the street travel positioning procedure automatically occurs on shutting off the so-called forward release switch.

The entire working hydraulics are shut off and controlled by this forward release switch, also called a "TUV" switch. This is required during street travel in order to prevent the front harvesting attachment or other units from moving in an unintended manner or from operating.

Automatically putting the street travel positioning procedure into operation, when the main drive for the working mechanism of the harvesting machine, for example the drive of the chopper drum of the field chopper and/or the harvesting drum of a harvester thresher, is turned off, is another possibility.

Alternatively or in addition, activation of the street travel positioning procedure can be associated with the start of street travel of the harvesting machine, i.e. driving the harvesting machine in the more rapid second gear. So that the transfer device is not put in the street travel position when that is not intended, e.g. when the driver or operator would like to do harvesting work in the more rapid gear under exceptional circumstances, the street travel positioning procedure is only turned on preferably in combination with an additional step for starting the street travel positioning procedure, for example operation of the forward release switch.

In order to avoid automatically pivoting the transfer device into the street travel position when a person is present on the harvesting machine and in the pivot path of the transfer device so that the person is hit by the swinging transfer device, preferably the street travel positioning procedure is only activated or started when the harvesting machine is already traveling. The activation can also be delayed somewhat, for example until after the harvesting machine travels a predetermined time interval and/or until it has travel a certain distance.

In an especially important embodiment the procedure starts when the harvesting process is finished and the machine is prepared to travel on the road or street. In this case the following combination of events takes place:

the main drive and operation of the machine is turned off, if necessary combined with a minimized travel distance or minimized travel time;

the street travel process is started and the forward release switch is turned on.

The travel of the transfer device from the working position to the street travel position can occur in two steps. For example, in a first step the transfer device is first swung over the supporting member and then lowered in a next step. Alternatively the transfer device can be simultaneously lowered and pivoted about its vertical axis in a coordinated manner. In this way the transfer device can be moved from its working position to its travel position in the fastest possible manner.

In both embodiments the pivoting speed about the vertical axis and/or the lowering speed is controlled, preferably according to the distance of the actual position of the transfer device to the desired target position.

In a preferred embodiment a shut off switch is arranged on the supporting member, which operates in response to the positioning of the transfer device in the street travel position. Because of that the street travel positioning procedure will be terminated. Preferably the signal from the shut off switch can be used for calibration of the position measuring sensors.

In as much as an ejector chute door is located in the outlet end of the transfer device, as is the case with the ejector chute of a field chopper, it preferably travels into the resting position automatically during the street travel positioning procedure, for example in a horizontally extended position.

The transfer device can comprise several connected transfer device sections, which are connected with each other by horizontal axles.

In this latter embodiment individual sections can be pivoted about their respective horizontal axles in the street travel positioning procedure in order to put the transfer device on the supporting member.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
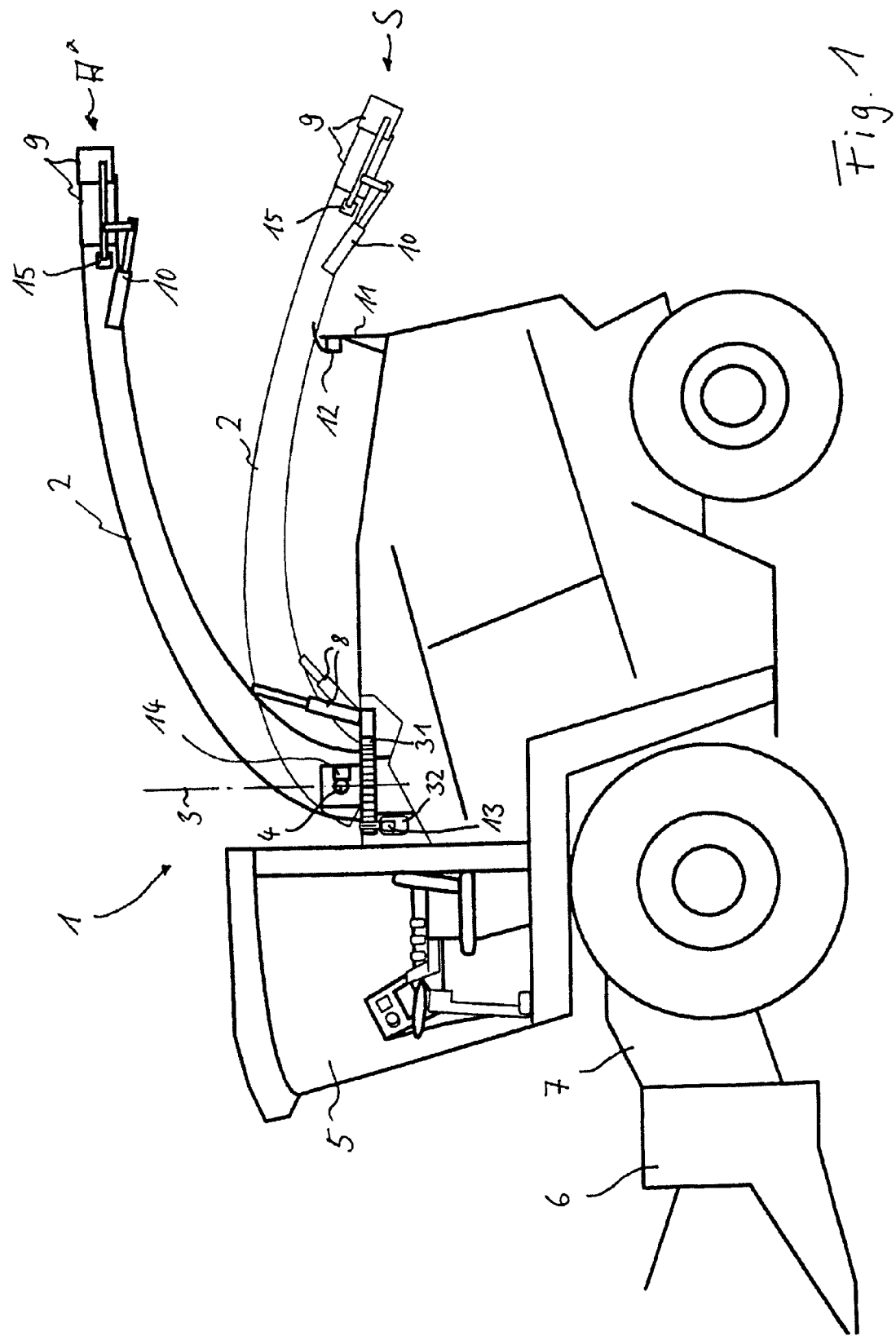
FIG. 1 is a side view of a standard chopper with an ejector chute swung to the rear, which is shown in two different positions.
Figure 2:
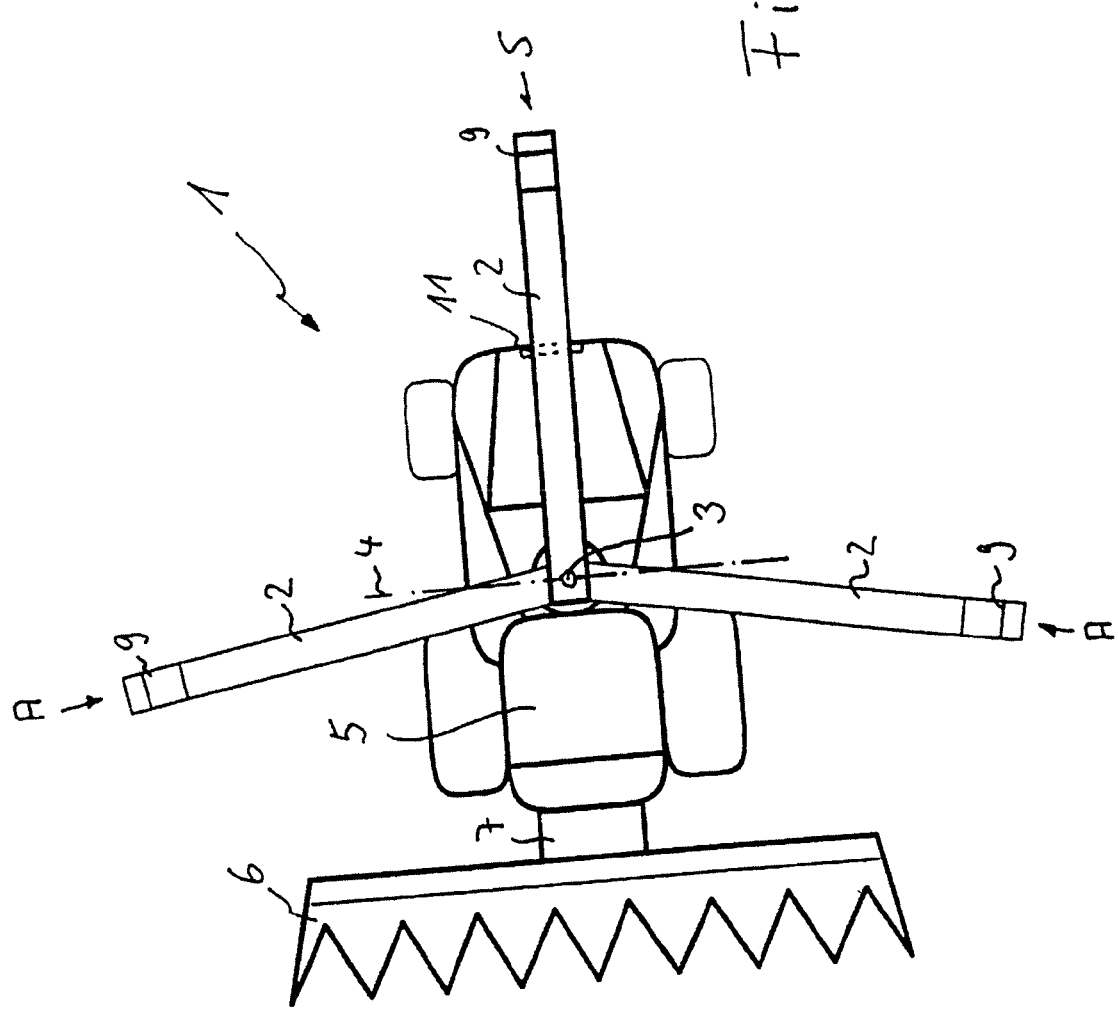
FIG. 2 is a top plan view of the standard chopper according to FIG. 1 showing the ejector chute in a right side and left side working position and in the standard street travel position.

The harvesting machine 1 shown in FIGS. 1 and 2 is a matter of a standard field chopper 1. During harvesting the plants to be cut down are cut down by means of a front harvesting attachment 6, here for example by means of corn teeth, and are conducted into the interior of the field chopper by means of intake device 7. The cut-down plants are chopped up in a chopping drum (not shown) and the chopped up harvested material is subsequently transferred by the transfer device 2, here an ejector chute, into an unshown transporting vehicle, which travels next to the chopper 1 during the harvesting. The ejector chute 2 is arranged immediately behind the driver's compartment 5 of the chopper 1. It can pivot about both a vertical axis 3 and horizontal axis 4 in order to change its height and lateral position.

An ejector chute door 9 is located at the outlet end of the ejector chute 2. The position of the ejector chute door 9 is changeable by means of a hydraulic cylinder 10. The ejection width, i.e. the distance between the outlet end of the ejector chute 2 and the impact point of the goods on the transport vehicle, can be controlled by positioning the ejector chute door 9. If the ejector chute door 9 is pivoted down, the ejection width is less than the corresponding width for an upwardly swung ejector chute door 9 with constant height of the ejector chute 2.

In FIG. 2 the ejector chute 2 is shown in the street travel position and in the preferred traveling working positions A, in which the ejector chute 2 is pivoted toward the front and inclined to the left or the right. Besides the working positions A shown in FIG. 2 the ejector chute 2 can be located on the transport vehicle, however also at other positions for unloading, in so far as the transport vehicle is located at a suitable or matching position. Especially the ejector chute 2, in so far as the transport vehicle travels behind the chipper 1 during harvesting, can be found in a position extending rearward and above the supporting member 11 (position A' in FIG. 1).

Figure 3:
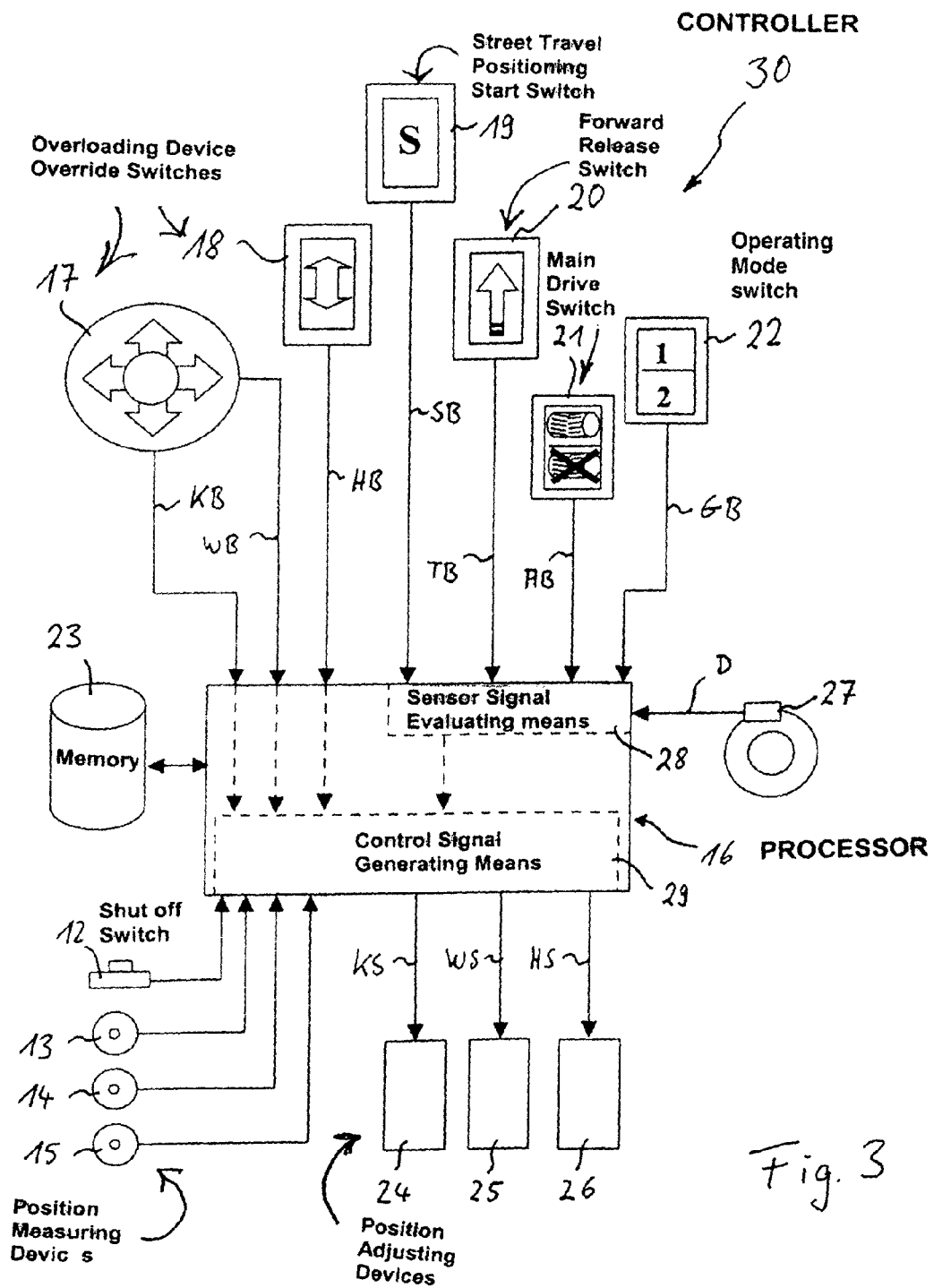
FIG. 3 is a block diagram of a preferred embodiment of an electronic controller according to the invention for controlling the ejector chute of the chopper shown in FIGS. 1 and 2.

FIG. 3 shows an example of an electronic controller 30 for the apparatus according to the invention. A processor 16, for example a microcontroller, is a central part of this controller 30. The processor 16 receives control commands KB, WB, HB, SB, TB, AB, GB input by the user via a user interface with buttons and switches 17, 18, 19, 20, 21, 22.

One of these keys is a rocker switch 18 for changing the height of the ejector chute 2 by pivoting about the horizontal axis 4. A suitable height position control command HB is input to the processor 16 depending on whether or not the driver has tilted the rocker switch 18 upward or downward. Furthermore the user interface has a multidirectional button 17, which can be turned to four positions or directions. This multidirectional button 17, for example, can be integrated in a multifunctional handle, so that the driver can operate the multidirectional button 17 with his thumb. A suitable pivot angle control command WB is provided with a rocking or turning motion toward the right or left, in order to swing the ejector chute 2 left or right around the vertical rotation axis 3. A suitable ejector deflector lid command KB is produced by rocking or turning the multidirectional switch 17 upward or downward, with which the ejector chute door 9 is raised or lowered. The design and arrangement of the rocker switch 18 and the multidirectional button 17 are selected so that the driver intuitively turns them in the correct direction.

The input control commands KB, WB, HB are first processed internally in the processor 16. The processor 16 then sends a suitable adjusting signal KS, WS, HS to a height position adjusting device 26, a pivot angle adjusting device 25 or an ejector chute door adjusting device 24. In the present embodiment the height position adjusting device 26 and the ejector chute door adjusting device flap 24 comprise valves, which control respective hydraulic cylinders 8, 10, with which the ejector chute 2 is swung about the horizontal axis 4 and the ejector chute door 9 is tilted or inclined relative to the ejector chute 2 respectively. Both hydraulic cylinders 8, 10 for adjusting the height of the ejector chute 2 and for adjusting the ejector chute door 9 are easily seen in FIG. 1. The pivot angle adjusting device 25 for swinging the ejector chute about the vertical axis 3 comprises a hydraulic motor 32 and a hydraulic pump (not shown), which delivers a quantity of oil to the hydraulic motor 32. The hydraulic motor 32 engages in a rotating track 31 of the ejector chute 2 by means of a worm gear and rotates it about the vertical axis 3. A stepping motor or the like can be used instead of the hydraulic motor, which is directly controlled with the suitable electrical control signals.

It is clear that the control signals KS, WS, HS from the processor 16 must be adjusted, as required, for the respective adjusting devices 24, 25, 26, for example they must be converted from a digital form to an analog form. That is also true for all control commands coming from the keys and buttons of the user interface, which must be converted from an analog form to a digital form for the processor 16. The required devices for that purpose however are not shown in the figures to make the figures easier to read. They can be part of the processor 16 and also part of the user interface and/or the individual adjusting devices 24, 25, 26. They can also be separate units, which are switched respectively between the interface, the processor 16 and/or the respective adjusting devices 24, 25, 26.

The actual control means 29 is embodied within the processor 16 in the form of software, i.e. a processor program. It is shown in FIG. 3 by a box drawn with dashed lines and labeled with the reference number 29. This control means 29 of the electronic controller 30 controls the individual adjusting devices 24, 25, 26, among other things, on the basis of the control commands KB, WB, HB input by the user. In other words the control commands KB, WB, HB are converted into the adjusting signals KS, WS, HS for the adjusting devices 24, 25,26.

So that the actual positions of the ejector chute 2 and the ejector chute door 9 can be accounted for during the pivoting, position measuring devices 13, 14, 15 are located at suitable positions on the ejector chute 2 and the ejector chute door 9. These position measuring devices 13, 14, 15 register the respective actual positions and transmit suitable position signals to the processor 16. They are a potentiometer 15 for determining the ejector chute door position, a potentiometer 14 for determining the pivot angular position of the ejector chute 2 about horizontal axis 4 and a potentiometer 13 for determining the pivot angle position about the vertical axis 3. Alternatively the actual position data can also be obtained purely from a software program, for example by protocols together with the control commands KB, WB, HB and/or the adjusting signals KS, WS, HS. Then they can be temporarily stored.

The fully automatic street travel positioning by the control unit 29 occurs in such a way that the actual positions of the ejector chute 2 and the ejection door 9 are first ascertained by means of positioning signals obtained from the position measuring devices 13, 14, 15. Moreover the position data for the street travel position, i.e. the position on the supporting member 11, is retrieved from the memory 23. Then the height position adjusting signal HS and the pivot angle adjusting signal WS are input to the height position adjusting device 26 and the pivot angle positioning device 25 so that the ejector chute 2 preferably is swung on the fastest path directly from the actual position A to the street travel position S. The speed is controlled according to the present distance to the street travel position S, i.e. according to the closeness to the individual target position regarding the pivoting about the vertical axis 3 and the horizontal axis 4. First the ejector chute 2 is swung comparatively rapidly about the vertical axis 3, so that it is found close to a position above the supporting member 11. Then a slow approach to the exact position occurs. In this latter process the ejector chute 2 is first swung comparatively rapidly about the horizontal axis 4. Then the speed is reduced more as the ejector chute 2 approaches to the supporting member 11 so that the ejector chute 2 is finally very gently placed on the supporting member 11.

A shut off switch 12 is located on the upper side of the supporting member 11, which is switched or activated when the ejector chute 2 is placed on the supporting member 11. This shut off switch 12 produces a signal input to the processor 16, whereby the control means 29 interrupts the positioning process. The shut off switch 12 is in the first place an additional guarantee that the control means knows the current actual position date for the ejector chute 2 without more data or effort via the position measuring devices 13, 14, 15.

Additionally to the automatic pivoting of the ejector chute 2 about the vertical axis 3 and about the horizontal axis 4 the ejector chute door 9 moves from the extended resting position shown in FIG. 1 in response to a suitable ejector chute door adjusting signal KS input to the ejector chute door adjusting device 24.

The electronic controller 30 has an evaluating means 28 for triggering the automatic street travel positioning process. This evaluating means 28 is embodied in the form of a suitable software program in the processor 16. It also can be embodied in the form of a suitable subroutine within the control means 29. This evaluating means 28 evaluates different control commands SB, TB, AB, GB or status signals D of the machine 1, which are input to the processor 16.

The commands that are considered by the evaluating means 28 include a forward release command TB produced when a forward release switch 20 is switched on, a shut off command AB produced when the main drive of the copper drum is turned off by means of the main drive switch 21 and an operation mode switching command GB, when the operation mode switches especially from harvesting operation to a second faster operation mode for street travel, by means of an operation mode switch 22. Furthermore status signal D of the travel speed and/or travel distance sensor 27 is evaluated, from which the speed of the harvesting machine 1 is derived. The travel time can be calculated by the evaluating means 28 with the help of this status signal D, which is required, since the harvesting machine or chopper 1 travels further after the last stop. Also the distance covered up to now can thus be computed.

The control commands TB, AB, GB coming from the forward release switch 20, the main drive switch 21 and the operation mode switch 22 are also conducted directly to the concerned unit (not shown), in order to conduct the desired switching process. However it is also possible that the control commands are first conducted only to the processor 16 and evaluated there and then suitable signals are fed from the processor 16 to the concerned unit (not shown).

The evaluating means 28 is programmed so that when certain results occur, which are determined by the input control commands TB, AB, GB or signal D, i.e. the street travel positioning procedure is activated with certain operating states and/or machine parameters and/or control commands or combinations thereof. In the case of the present embodiment the evaluating means 28 is formed so that the automatic street positioning process is then activated, either when the main drive of the chopper drum is turned off and the harvesting machine has already covered a predetermined distance or the machine has traveled for a predetermined time interval. Alternatively the automatic positioning procedure is activated by the evaluating means 28, when the street travel process, i.e. the second process is input, and furthermore the forward release switch 20 is turned on.

Besides these automatic activation processes it is also possible for the driver to activate the street travel positioning process by operating a street travel positioning command key 19. The street travel positioning command key 19 sends a suitable street travel positioning command SB to the evaluating means 28. Alternatively this street travel positioning command SB can also be transmitted directly, i.e. by-passing the evaluating device 28, to the control means 29.

The automatic mechanism according to the invention may be overridden by means of a conventional operators' button or key for the ejector chute 2 and the ejector chute door 9, or even by turning off a special key or key combination.

However the figures and the above detailed description show only one embodiment of the invention. It should be pointed out that one skilled in the art would understand that many variations of this single presented embodiment that would fall within the scope of the invention as claimed by the claims below are possible. For example, the added shut off switch 12 can be eliminated. Furthermore the standard tachometer in the harvesting machine 1 can be used instead of special travel speed and/or travel distance sensors. Especially the processor 16 can be part of a larger computer means, which controls the operation state and function of the harvesting machine.

The disclosure in German Patent Application 102 42 164.1 of Sep. 10, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for controlling a transfer device, especially of a harvesting machine, the transfer device and the harvesting machine with the transfer device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of controlling a transfer device (2) pivotally mounted on a harvesting machine (1) so as to be pivotable about a horizontal axis (4) and a vertical axis (3), said method comprising the steps of:
   a) automatically pivoting the transfer device from an actual position (A) around said vertical axis (3) of the transfer device into another position above a supporting member (11) for the transfer device arranged on the harvesting machine; and
   b) automatically lowering the transfer device into a street travel position (S) on the supporting member (11) in an event-controlled street travel positioning procedure,
   wherein the street travel positioning procedure occurs automatically on switching the harvesting machine (1)

into a predetermined operating state or operating state combination and/or during registering of predetermined machine parameters or machine parameter combinations of the harvesting machine (1),
wherein the street travel positioning procedure is activated automatically by switching off a main drive of a working device of the harvesting machine (1).

2. The method as defined in claim 1, wherein the street travel positioning procedure is activated or triggered by a street travel position command (SB) input to a user interface (19).

3. The method as defined in claim 1, wherein the street travel positioning procedure is activated automatically by turning on a forward release switch (20) of the harvesting machine (1).

4. The method as defined in claim 1, wherein the transfer device (2) is first swung over the supporting member (11) in a first step in the street travel positioning procedure and then is lowered onto the supporting member (11) in a following step.

5. The method as defined in claim 1, wherein the transfer device is provided with an ejector chute door (9) arranged at a outlet end of the transfer device and the ejector chute door (9) is moved into a rest or idle position during the street travel positioning procedure.

6. A method of controlling a transfer device (2) pivotally mounted on a harvesting machine (1) so as to be pivotable about a horizontal axis (4) and a vertical axis (3), said method comprising the steps of:
a) automatically pivoting the transfer device from an actual position (A) around said vertical axis (3) of the transfer device into another position above a supporting member (11) for the transfer device arranged on the harvesting machine; and
b) automatically lowering the transfer device into a street travel position (S) on the supporting member (11) in an event-controlled street travel positioning procedure,
wherein the street travel positioning procedure occurs automatically on switching the harvesting machine (1) into a predetermined operating state or operating state combination and/or during registering of predetermined machine parameters or machine parameter combinations of the harvesting machine (1),
wherein the street travel positioning procedure is first activated, after the harvesting machine (1) travels for a predetermined time interval and/or a predetermined distance.

7. A method of controlling a transfer device (2) pivotally mounted on a harvesting machine (1) so as to be pivotable about a horizontal axis (4) and a vertical axis (3), said method comprising the steps of:
a) automatically pivoting the transfer device from an actual position (A) around said vertical axis (3) of the transfer device into another position above a supporting member (11) for the transfer device arranged on the harvesting machine; and
b) automatically lowering the transfer device into a street travel position (S) on the supporting member (11) in an event-controlled Street travel positioning procedure,
wherein the street travel positioning procedure occurs automatically on switching the harvesting machine (1) into a predetermined operating state or operating state combination and/or during registering of predetermined machine parameters or machine parameter combinations of the harvesting machine (1),
wherein the transfer device (2) is simultaneously swung in a coordinated manner about the vertical axis (3) and the horizontal axis (4) directly from said actual position (A) in the street travel positioning procedure.

8. The method as defined in claim 7, wherein the street travel positioning procedure is first activated when a street travel process is switched on.

9. The method as defined in claim 7, wherein the transfer device (2) is pivoted simultaneously about said vertical axis (3) and said horizontal axis (4) with a pivoting speed according to a distance of said actual position (A) of the transfer device (2) from a target position of the pivoting motion.

10. An apparatus for controlling a transfer device (2) arranged on a harvesting machine (1) so as to be pivotable about vertical pivot axis (3) and a horizontal pivot axis (4), said apparatus comprising an electronic controller (30);
wherein said electronic controller (30) comprises means for automatically swinging or pivoting the transfer device from an actual position (A) around a vertical pivot axis (3) of the transfer device into another position above a supporting member (11) for the transfer device arranged on the harvesting machine; and means far automatically lowering the transfer device into a street travel position (S) on the supporting member (11) in an event-controlled street travel positioning procedure, and
a travel speed sensor and/or travel distance sensor.

11. The apparatus as defined in claim 10, wherein said controller (30) comprises
position-measuring means (13, 14, 15) for obtaining data regarding said actual position (A) of the transfer device (2), and
means for generating a height position adjusting signal (HS) for a height position adjusting device (26) for swinging the transfer device about the horizontal axis (4) and a pivot angle adjusting signal (WS) for a pivot angle positioning device (25) for swinging the transfer device about the vertical axis (3) according to said actual position (A) of the transfer device (2) and a predetermined receiving position within the automatic street travel positioning procedure.

12. The apparatus defined in claim 10, wherein said electronic controller (30) has an evaluating device (28) comprising means for evaluating input control commands (TB, HB, GB) for controlling a harvesting machine (1) and/or status signals (D) representing a certain operating state and/or machine parameters of the harvesting machine (1) and means for triggering the street travel positioning procedure in response to said input commands and/or said status signals or combinations of said input commands and/or said status signals.

13. An apparatus for controlling a transfer device (2) arranged on a harvesting machine (1) so as to be pivotable about vertical pivot axis (3) and a horizontal pivot axis (4), said apparatus comprising an electronic controller (30);
wherein said electronic controller (30) comprises means for automatically swinging or pivoting the transfer device from an actual position (A) around a vertical pivot axis (3) of the transfer device into another position above a supporting member (11) for the transfer device arranged on the harvesting machine; and means for automatically lowering the transfer device into a street travel position (S) on the supporting member (11) in an event-controlled street travel positioning procedure, and
a shut off switch (12) arranged on the supporting element (11), which is activated when tie transfer device (2) is placed in the street travel position on the supporting element and which terminates the street travel positioning procedure when activated.

14. A harvesting machine comprising a transfer device (2) arranged so as to be pivotable about both a vertical axis (3) and a horizontal axis (4) and an apparatus for controlling said transfer device;
   wherein said apparatus comprises an electronic controller (30), said electronic controller comprising
   means for automatically swinging or pivoting the transfer device from an actual position (A) around said vertical pivot axis (3) of the transfer device into another position above a supporting member (11) of the transfer device arranged on the harvesting machine, and
   means for automatically lowering the transfer device into a street travel position (S) on the supporting member in an event-controlled street travel positioning procedure, and
   a travel speed sensor and/or travel distance sensor.

15. The harvesting machine as defined in claim 14, wherein said controller (30) comprises
   position-measuring means (13, 14, 15) for obtaining data regarding said actual position (A) of the transfer device (2), and
   means for generating a height position adjusting signal (HS) for a height position adjusting device (26) for swinging the transfer device about the horizontal axis (4) and a pivot angle adjusting signal (WS) for a pivot angle positioning device (25) for swinging the transfer device about the vertical axis (3) according to said actual position of the transfer device (2) and a predetermined receiving position within the automatic street travel positioning procedure.

16. The harvesting machine defined in claim 14, wherein said electronic controller (30) has an evaluating device (28) comprising means for evaluating input control commands (TB, HB, GB) for controlling operating functions of the harvesting machine (1) and/or for status signals (D) representing a certain operating state and/or machine parameters of the harvesting machine (1) and means for triggering the street travel positioning procedure in response to said input commands and/or said status signals or combinations of said input commands and/or said status signals.

17. A harvesting machine comprising a transfer device (2) arranged so as to be pivotable about both a vertical axis (3) and a horizontal axis (4) and an apparatus for controlling said transfer device;
   wherein said apparatus comprises an electronic controller (30), said electronic controller comprising
   means for automatically swinging or pivoting the transfer device from an actual position (A) around said vertical pivot axis (3) of the transfer device into another position above a supporting member (11) of the transfer device arranged on the harvesting machine, and
   means for automatically lowering the transfer device into a street travel position (S) on the supporting member in an event-controlled street travel positioning procedure,
   wherein said apparatus for controlling said transfer device comprises a shut off switch (12) arranged on the supporting element (11), which is activated when the transfer device (2) is placed in the street travel position on the supporting element and which terminates the street travel positioning procedure when activated.

18. The harvesting machine as defined in claim 14, consisting of a field chopper.

19. The harvesting machine as defined in claim 14, comprising a driver's compartment (5) and a front harvesting attachment (6).

* * * * *